(12) United States Patent
Purchase

(10) Patent No.: US 7,597,330 B1
(45) Date of Patent: Oct. 6, 2009

(54) VEHICLE STABILIZING SYSTEM

(76) Inventor: Ian Purchase, 2357 Westland Way, Acworth, GA (US) 30102

( * ) Notice: Subject to any disclaimer, the term of this patent is extended or adjusted under 35 U.S.C. 154(b) by 0 days.

(21) Appl. No.: 12/029,235

(22) Filed: Feb. 11, 2008

(51) Int. Cl.
    *B60G 21/045* (2006.01)
(52) U.S. Cl. ............. 280/5.506; 280/5.507; 280/5.508; 280/124.157
(58) Field of Classification Search ............. 280/5.506, 280/5.507, 5.508, 5.514, 124.157, 124.158, 280/124.159
    See application file for complete search history.

(56) References Cited

U.S. PATENT DOCUMENTS

| | | | |
|---|---|---|---|
| 3,598,424 A | 8/1971 | Crouch | |
| 3,602,525 A | 8/1971 | Moulton | |
| 4,072,325 A | 2/1978 | Bright et al. | |
| 4,128,259 A | 12/1978 | Trent | |
| 4,277,076 A | 7/1981 | Hanna | |
| 5,566,971 A * | 10/1996 | Perlot | 280/124.109 |
| 6,036,200 A * | 3/2000 | Kim | 280/5.506 |
| D496,610 S | 9/2004 | Belair | |
| 7,029,014 B2 * | 4/2006 | Hamm | 280/5.502 |
| 2002/0130474 A1 * | 9/2002 | Richardson | 280/5.507 |

* cited by examiner

*Primary Examiner*—Toan C To

(57) ABSTRACT

A vehicle stabilizing system includes a vehicle that has a suspension assembly. The vehicle has a first lateral side and a second lateral side. A horizontal level detecting apparatus is mounted on the vehicle and detecting centrifugal force is applied to the vehicle. A pair of bladders is operationally coupled to the horizontal level detecting apparatus and each is mounted to the suspension assembly. One of the bladders is mechanically coupled to a first wheel positioned adjacent to the first lateral side and the other one of the bladders is mechanically coupled to a second wheel positioned adjacent to the second lateral side. The bladders are selectively inflated to increase a distance between a chassis of the vehicle and a ground surface to counteract centrifugal and gravitational forces detected by the horizontal level detecting apparatus.

4 Claims, 10 Drawing Sheets

VEHICLE STABILIZING SYSTEM

BACKGROUND OF THE INVENTION

Field of the Invention

The present invention relates to vehicle stabilizing devices and more particularly pertains to a new vehicle stabilizing device for assisting a vehicle's suspension in retaining the vehicle in a horizontal orientation.

SUMMARY OF THE INVENTION

The present invention meets the needs presented above by generally comprising a vehicle has a suspension assembly. The vehicle has a first lateral side and a second lateral side. A horizontal level detecting apparatus is mounted on the vehicle and detecting centrifugal force is applied to the vehicle. A pair of bladders is operationally coupled to the horizontal level detecting apparatus and each is mounted to the suspension assembly. One of the bladders is mechanically coupled to a first wheel positioned adjacent to the first lateral side and the other one of the bladders is mechanically coupled to a second wheel positioned adjacent to the second lateral side. The bladders are selectively inflated to increase a distance between a chassis of the vehicle and a ground surface to counteract centrifugal and gravitational forces detected by the horizontal level detecting apparatus.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
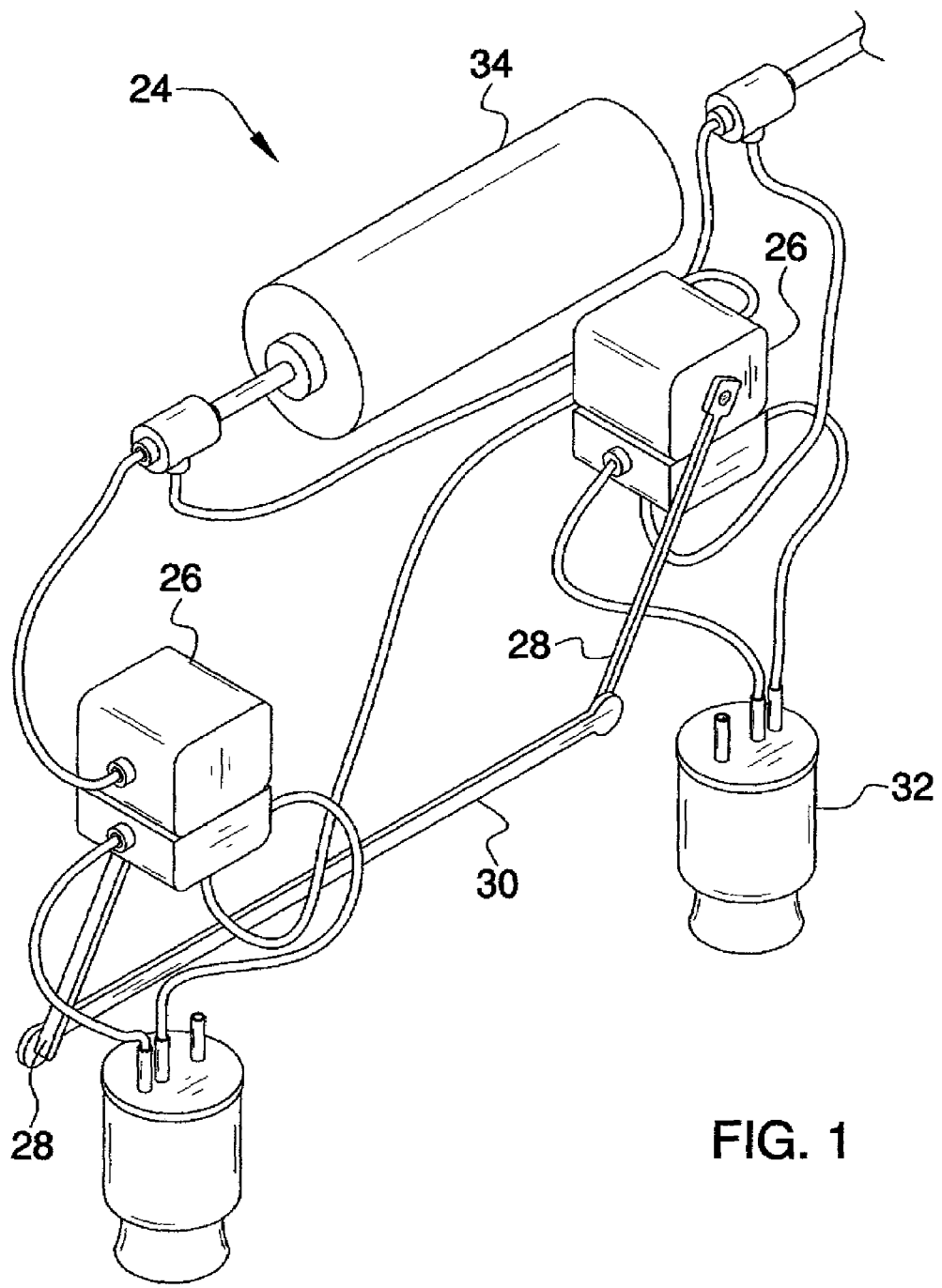
FIG. 1 is a top perspective view of a vehicle stabilizing system according to the present invention.
Figure 2:
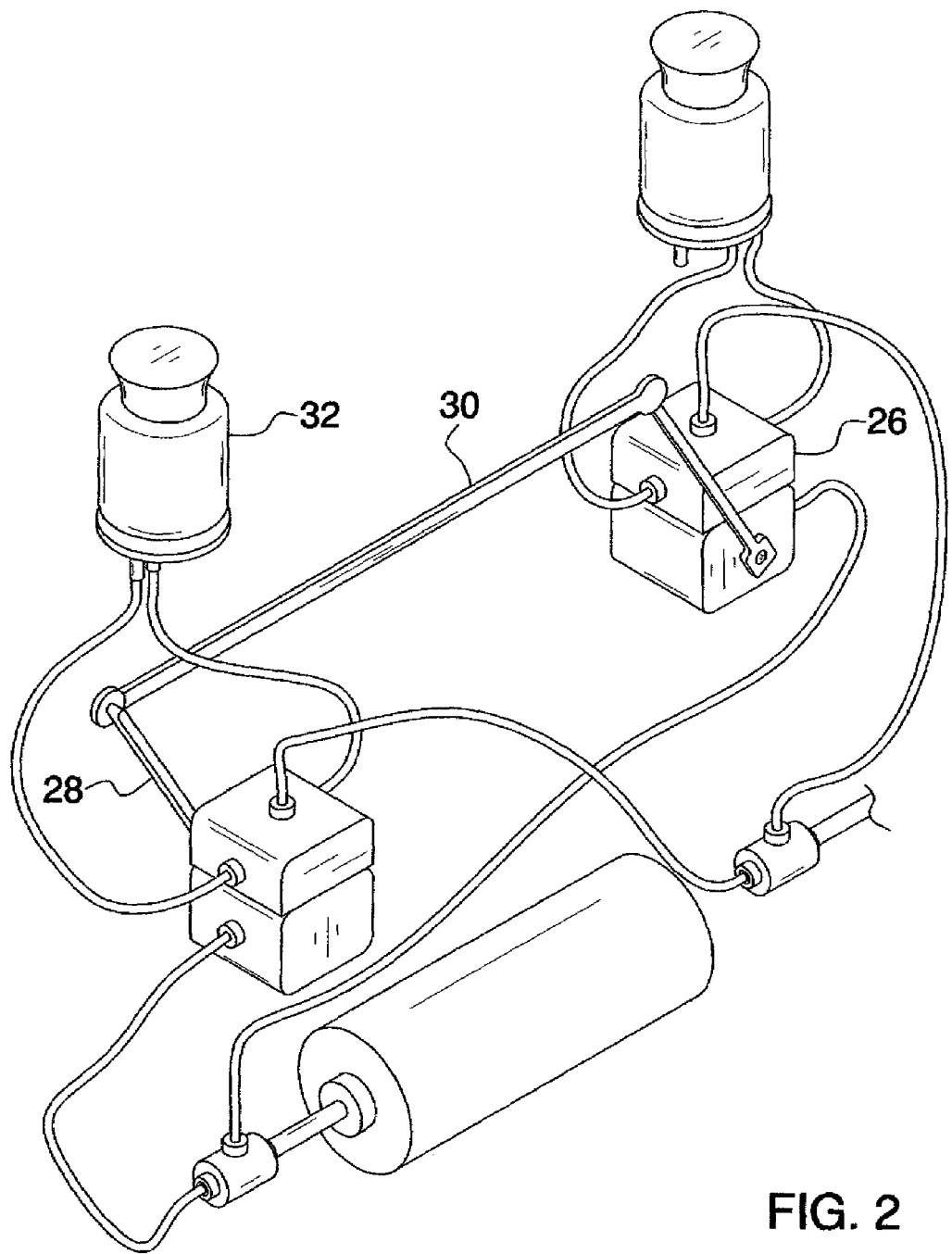
FIG. 2 is a bottom perspective view of the present invention.
Figure 3:
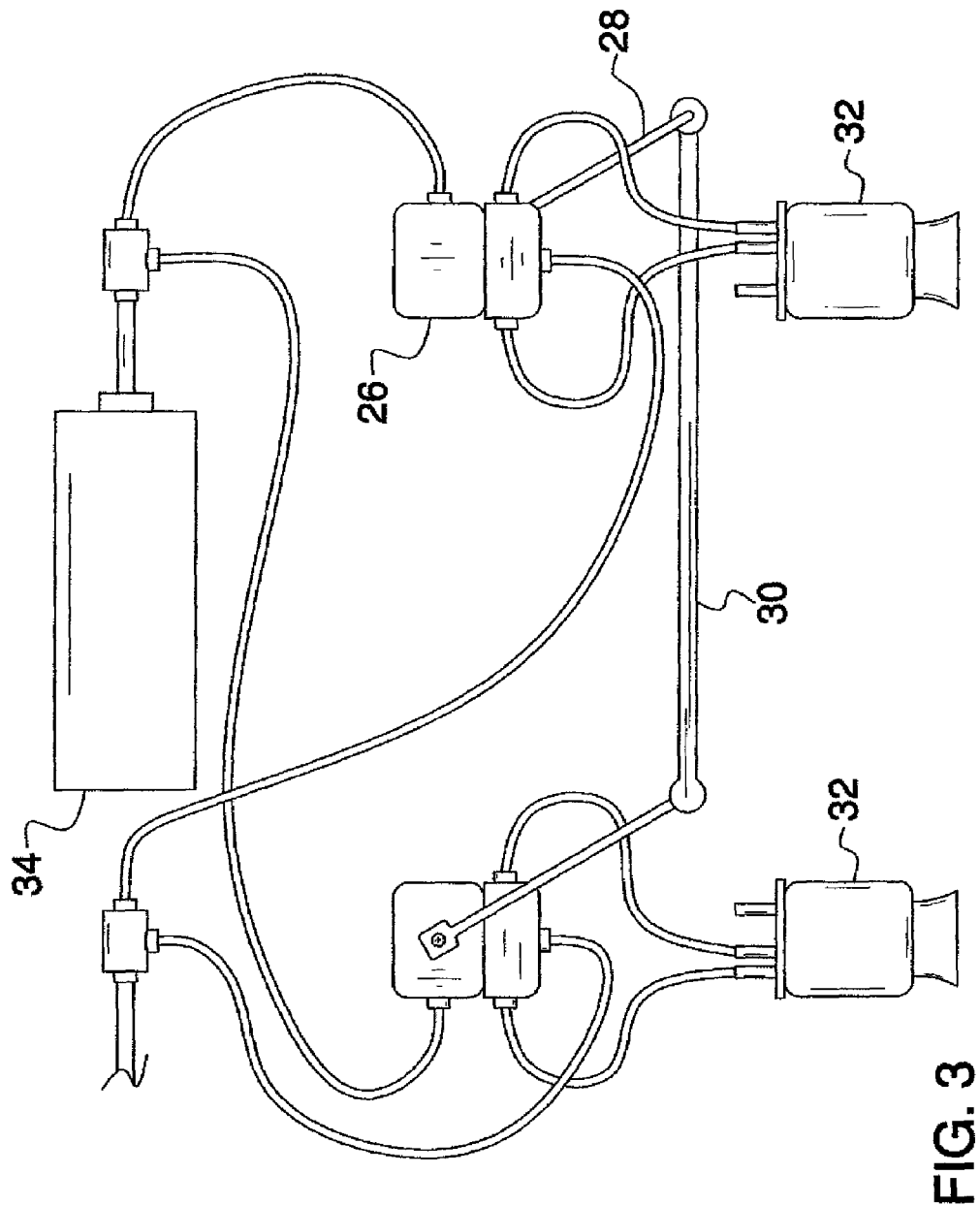
FIG. 3 is a front view of the present invention.
Figure 4:
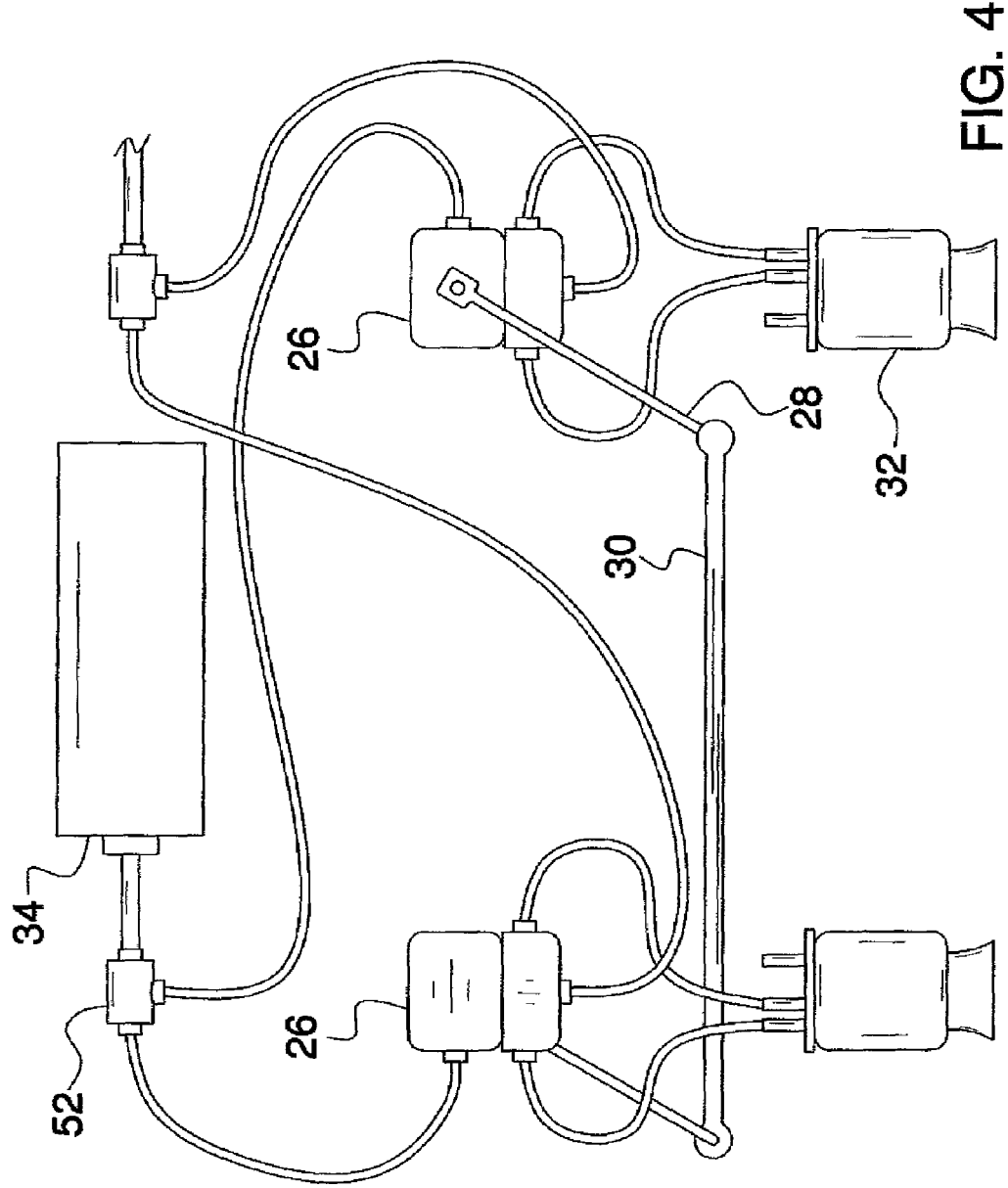
FIG. 4 is a rear view of the present invention.
Figure 5:
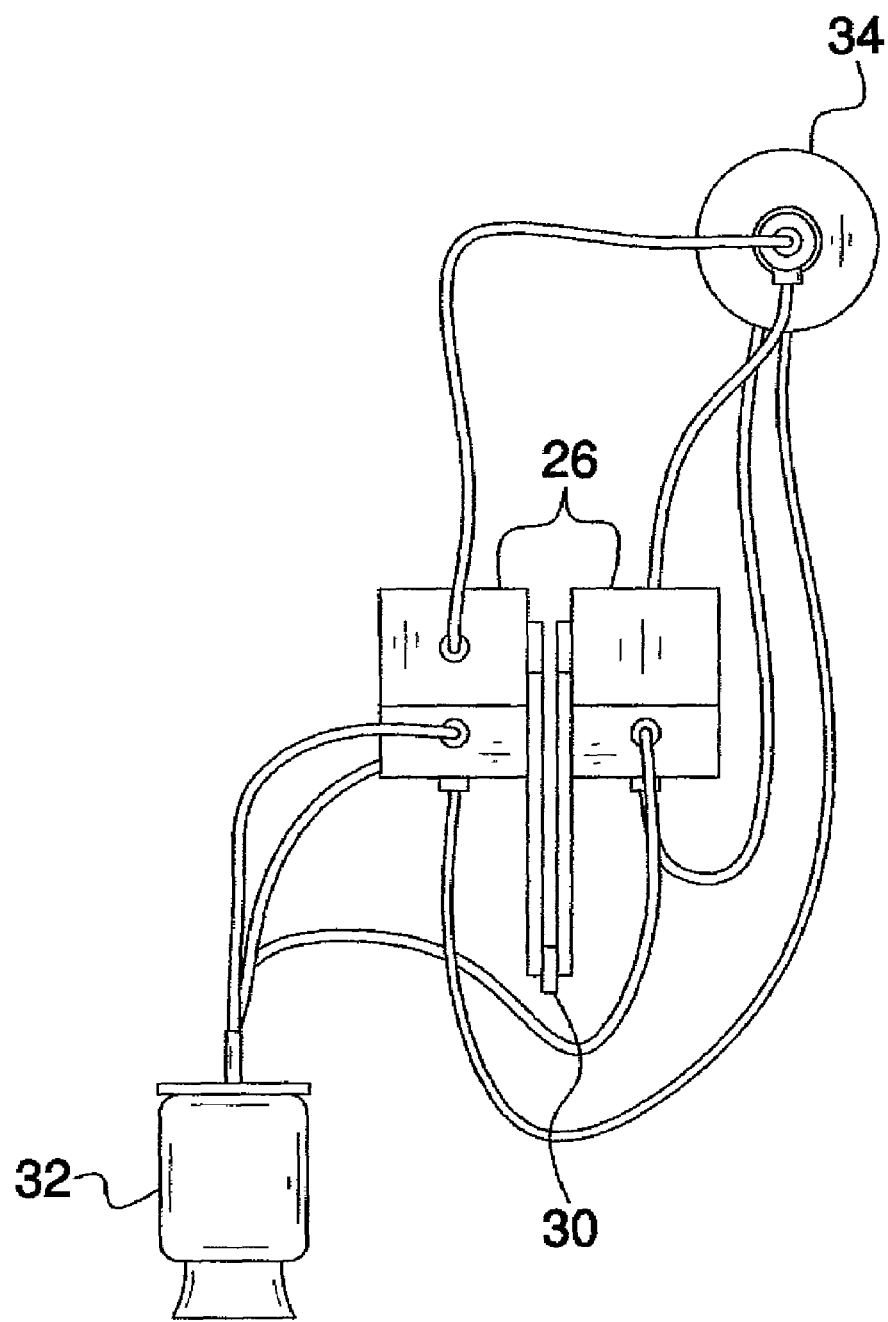
FIG. 5 is a right side view of the present invention.
Figure 6:
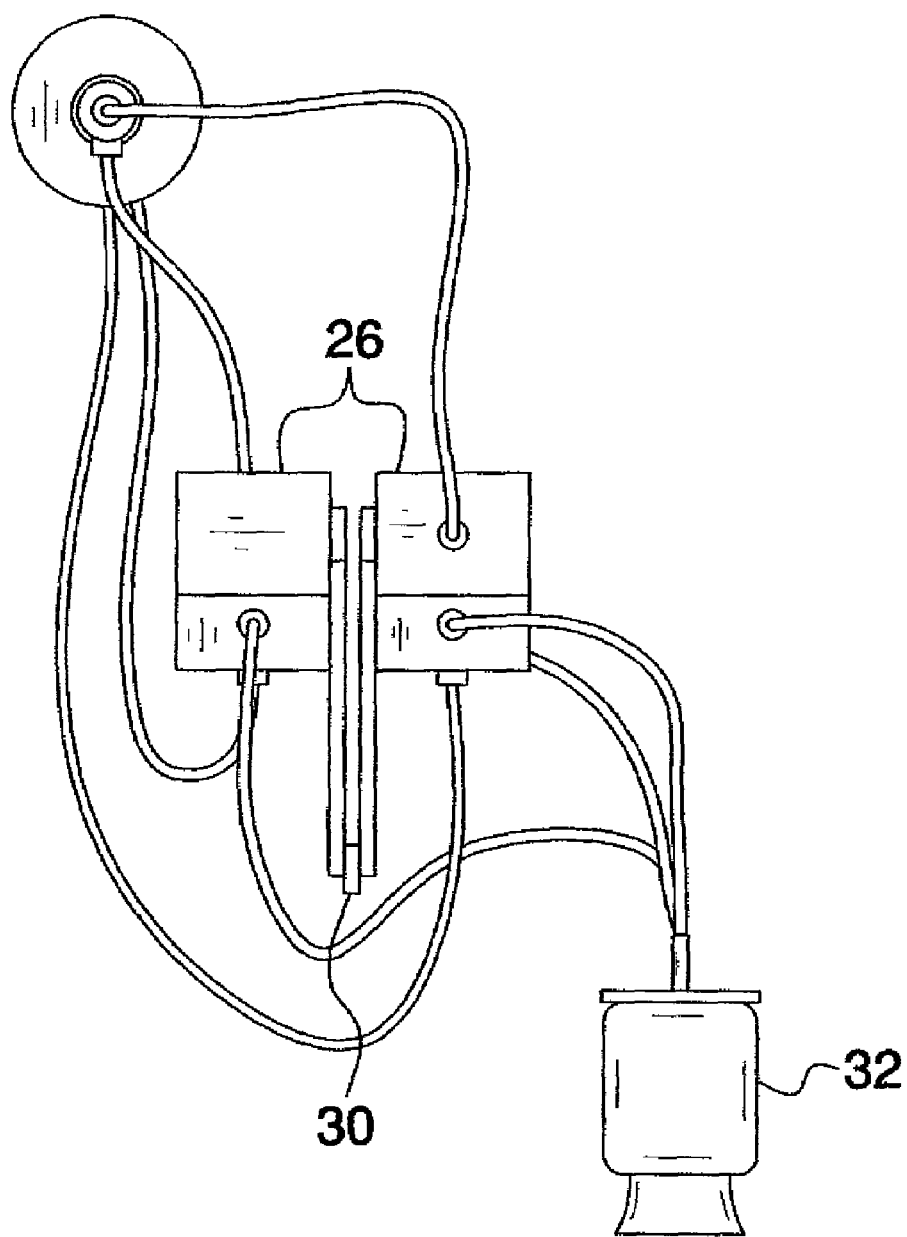
FIG. 6 is a left side view of the present invention.
Figure 7:
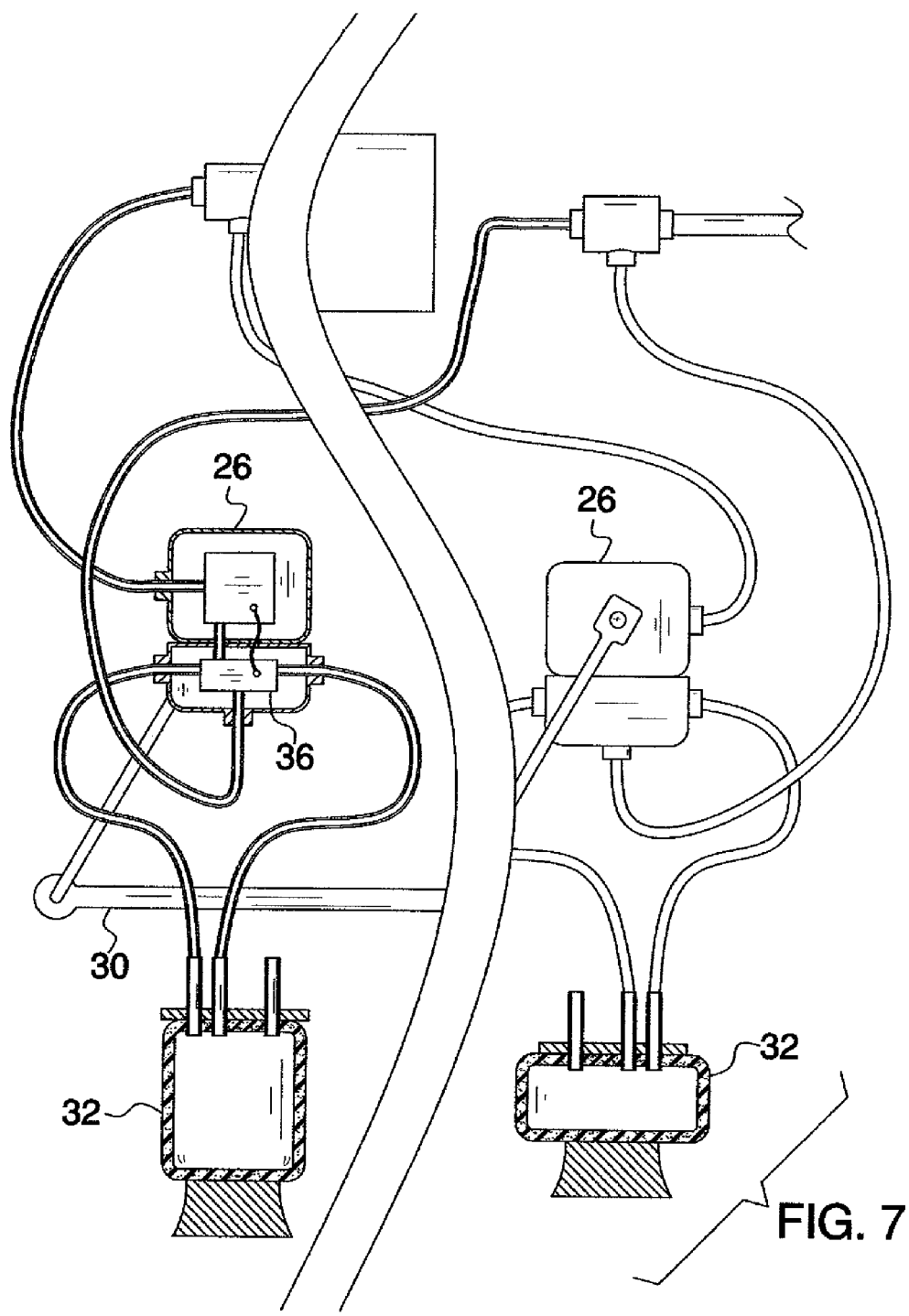
FIG. 7 is a broken front view of the present invention.
Figure 8:
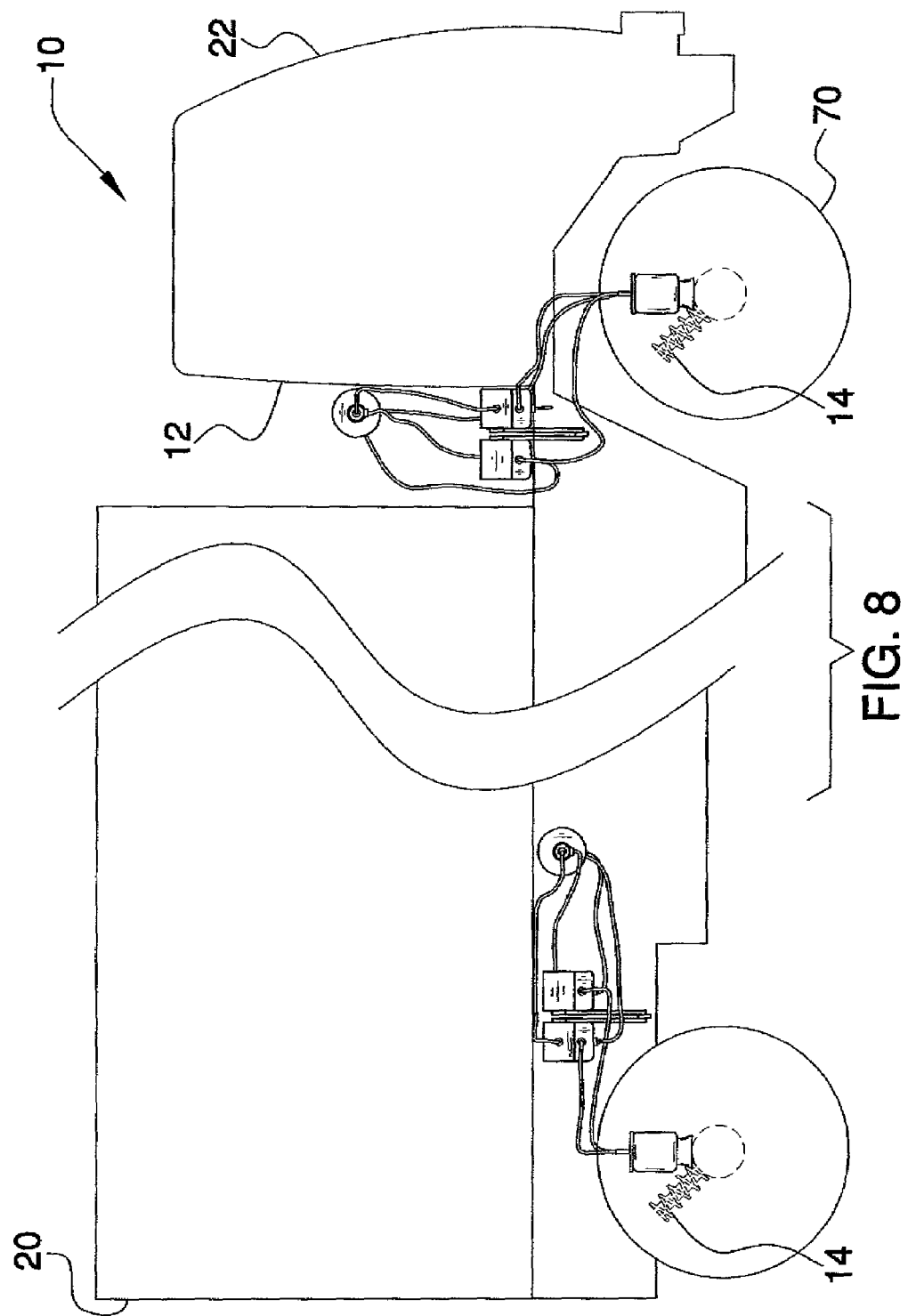
FIG. 8 is a side view of a vehicle the present invention.
Figure 9:
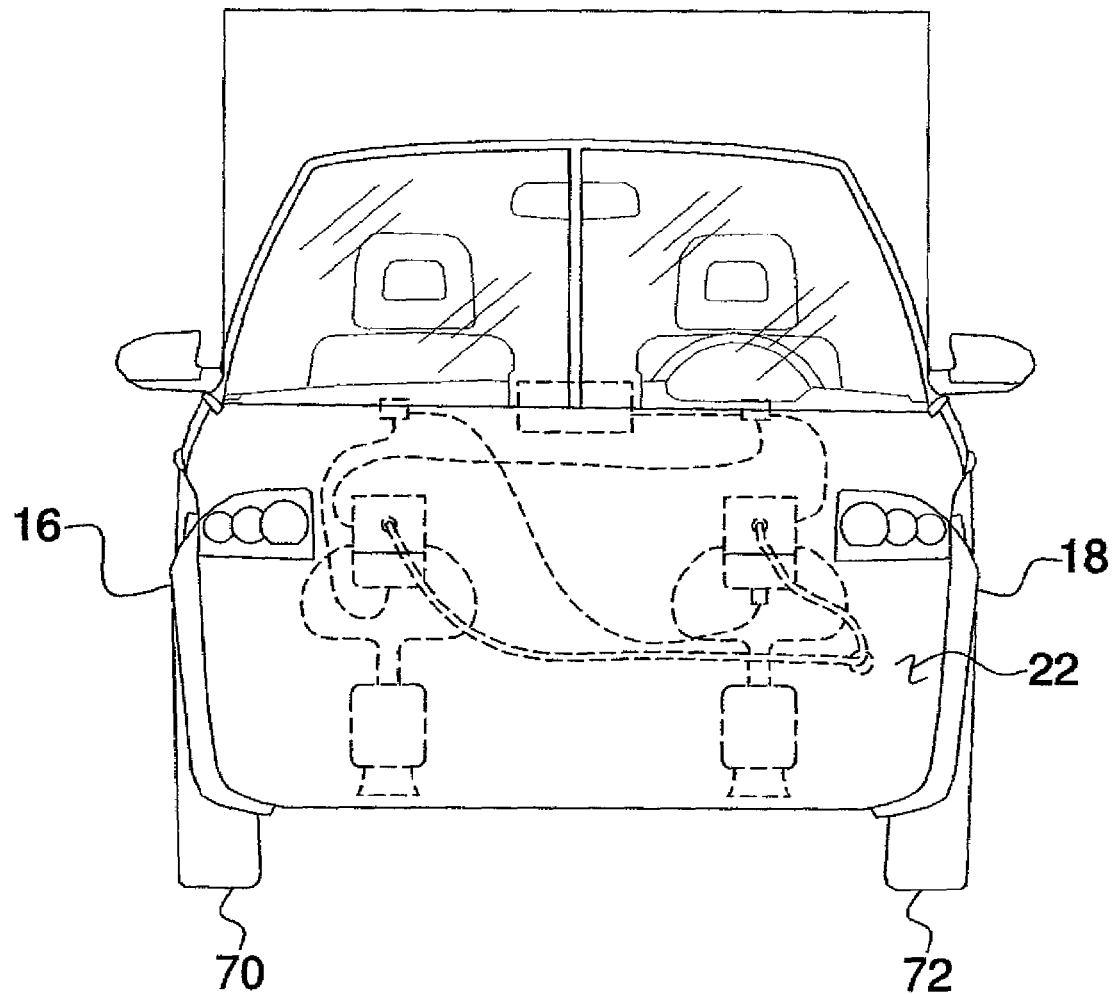
FIG. 9 is a front view of the vehicle present invention.
Figure 10:
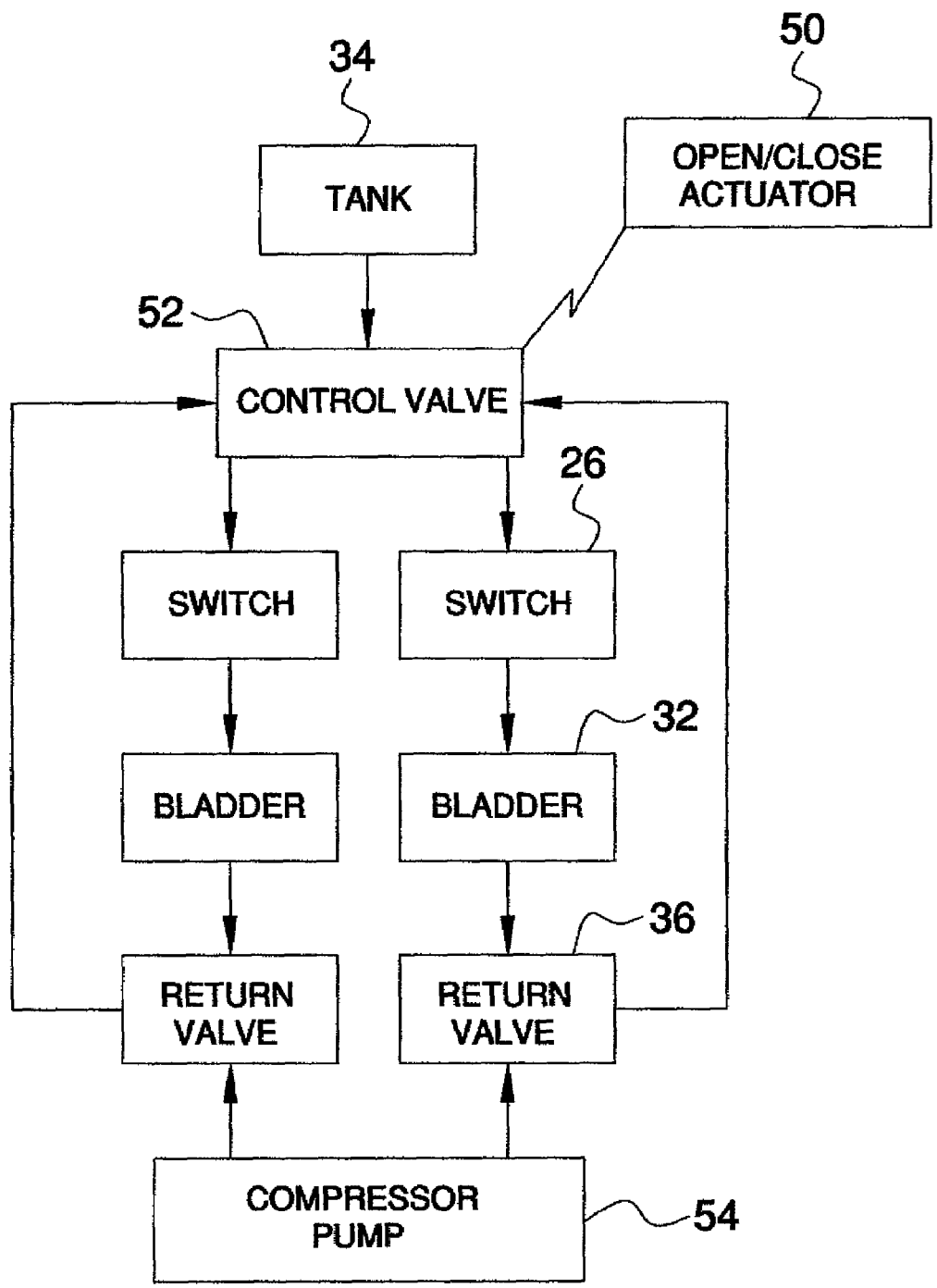
FIG. 10 is a schematic view of the present invention.

With reference now to the drawings, and in particular to FIGS. 1 through 10 thereof, a new vehicle stabilizing device embodying the principles and concepts of the present invention and generally designated by the reference numeral 10 will be described.

As best illustrated in FIGS. 1 through 10, the vehicle stabilizing system 10 generally comprises a vehicle 12 that has a conventional suspension assembly 14. The vehicle 12 has a first lateral side 16 and a second lateral side 18, a back end 20 and a front end 22.

A horizontal level detecting apparatus 24 is mounted on the vehicle 12 and detects centrifugal force and gravitational force that is applied to the vehicle 12, such as through the turning of the vehicle 12. The horizontal level detecting apparatus 24 also may be used, generically speaking, to detect when a chassis of the vehicle 12 is not horizontally oriented in either a lateral direction or a front end 22 to a back end 20 direction. The horizontal level detecting apparatus 24 includes a pair of switches 26 and a pair of swing bars 28. Each of the swing bars 28 is pivotally coupled to and actuates one of the switches 26 when the swing bars 28 pivot. A connecting bar 30 is attached to and extends between the swing bars 28. The connecting bar 30 swings laterally to pivot the swing bars 28 when centrifugal force is applied to the vehicle 12 when the vehicle moves around a corner or is on an angled surface. The connecting bar 30 is mounted to extend between the first 16 and second 18 lateral sides of the vehicle 12. The horizontal level detecting apparatus 24 may also be oriented so that the pivot bar 30 extends between the front 22 and back 20 ends of the vehicle 12.

A pair of bladders 32 is provided. Each of the bladders 32 is mounted to the suspension assembly 14, and in particular each of the bladders 32 is used in conjunction with a spring or shock absorber of the tires 70, 72. One of the bladders 32 is mechanically coupled to a first wheel 70 positioned adjacent to the first lateral side 16 and the other one of the bladders 32 is mechanically coupled to a second wheel 72 positioned adjacent to the second lateral side 18. As mentioned above, the apparatus 24 may be positioned so that the bladders 32 are instead positioned by a wheel positioned adjacent to the back end 20 and by a wheel positioned adjacent to the front end 22. The bladders 32 are selectively inflated to increase a distance between the chassis of the vehicle 12 and a ground surface.

A tank 34 has compressed fluid therein. The fluid may be either a compressed liquid or compressed air. The fluid is fluidly coupled to the switches 26, which function as valves, and each of the bladders 32 is fluidly coupled to one of the switches 26. The switches 26 selectively transfer the fluid between the bladders 32 as the switches 26 are actuated by the swing bars 28. The bladders 32 assist in retaining the chassis in a horizontal orientation by correcting an orientation of the connecting bar 30. A processor is electrically coupled to the switches 26 and to return valves 36 to allow the fluid to be returned to the tank 34 and be re-circulated as needed between the bladders 32 or the switches 26 may include a pair of one way valves to allow the connecting bar to perform this function. An actuator 50 may be used with a control valve 52 to control whether or not the switches receive pressurized fluid from the tank 34. A compressor pump 54 may be fluidly coupled to the tank 34 to recompress the fluid within the tank 34.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stabilization and anti-roll system comprising:
   a vehicle having a suspension assembly, said vehicle having a first lateral side and a second lateral side;
   a horizontal level detecting apparatus being mounted on said vehicle and detecting centrifugal force being applied to said vehicle;
   a pair of bladders operationally coupled to said horizontal level detecting apparatus, each of said bladders being mounted to said suspension assembly, one of said bladders being mechanically coupled to a first wheel positioned adjacent to said first lateral side and the other one of said bladders being mechanically coupled to a second wheel positioned adjacent to said second lateral side, said bladders being selectively inflated to increase a distance between a chassis of said vehicle and a ground surface to counteract centrifugal force detected by said horizontal level detecting apparatus; and
   said horizontal level detecting apparatus including a pair of switches and a pair of swing bars, each of said swing bars being pivotally coupled to and actuating one of said switches when said swing bars pivot, a connecting bar being attached to and extending between said swing bars, said connecting bar swinging laterally to pivot said swing bars when centrifugal force is applied to said vehicle when said vehicle moves around at corner.

2. The system according to claim 1, wherein said connecting bar is mounted to extend between said first and second lateral sides.

3. The system according to claim 1, further including a tank having compressed fluid therein, said fluid being fluidly coupled to said switches, each of said bladders being fluidly coupled to one of said switches, said switches selectively transferring said fluid between said bladders as said switches are actuated by said swing bars, said bladders assisting in retaining said chassis in a horizontal orientation by correcting an orientation of said connecting bar.

4. A stabilization and anti-roll system comprising:
   a vehicle having a suspension assembly, said vehicle having a first lateral side and a second lateral side;
   a horizontal level detecting apparatus being mounted on said vehicle and detecting centrifugal force being applied to said vehicle, said horizontal level detecting apparatus including a pair of switches and a pair of swing bars, each of said swing bars being pivotally coupled to and actuating one of said switches when said swing bars pivot, a connecting bar being attached to and extending between said swing bars, said connecting bar swinging laterally to pivot said swing bars when centrifugal force is applied to said vehicle when said vehicle moves around a cornet, said connecting bar being mounted to extend between said first and second lateral sides;
   a pair of bladders, each of said bladders being mounted to said suspension assembly, one of said bladders being mechanically coupled to a first wheel positioned adjacent to said first lateral side and the other one of said bladders being mechanically coupled to a second wheel positioned adjacent to said second lateral side, said bladders being selectively inflated to increase a distance between a chassis of the vehicle and a ground surface; and
   a tank having compressed fluid therein, said fluid being fluidly coupled to said switches, each of said bladders being fluidly coupled to one of said switches, said switches selectively transferring said fluid between said bladders as said switches are actuated by said swing bars, said bladders assisting in retaining said chassis in a horizontal orientation by correcting an orientation of said connecting bar.

* * * * *